May 14, 1963
A. B. WALLS
3,090,039
BISTABLE INDICATOR CIRCUIT
Filed Aug. 25, 1960
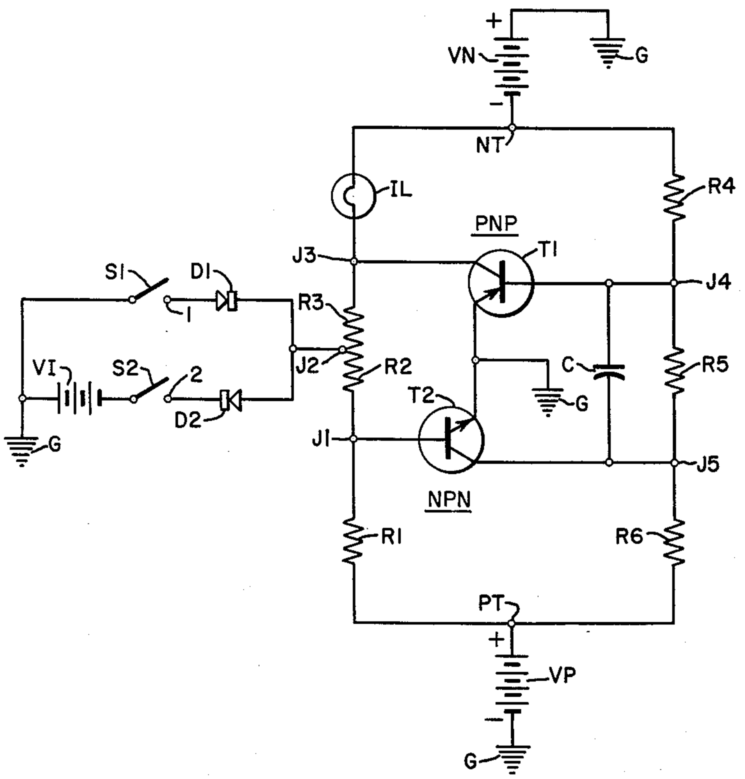
WITNESSES:
Bernard R. Giegucz
James F. Young
INVENTOR
Allen B. Walls
BY
Paul E. Friedemann
ATTORNEY United States Patent Office 3,090,039

Patented May 14, 1963

3,090,039

BISTABLE INDICATOR CIRCUIT

Allen B. Walls, Catonsville, Md., assignor to Westinghouse Electric Corporation, East Pittsburgh, Pa., a corporation of Pennsylvania Filed Aug. 25, 1960, Ser. No. 51,826
5 Claims. (Cl. 340—252)

This invention relates to bistable circuitry and more particularly to a read-out circuit for computer devices.

In digital equipment it is usually desirable to have a visual indication of the state of the results of a calculation being made by the equipment.

Since digital equipment presently in use operates at rather low voltage, but the read-out circuitry, to actuate an incandescent indicator lamp of sufficient brightness to be practical, has to operate at a higher voltage and has to be reliably bistable in function. Bistability is not a necessity but is desirable.

One broad object of this invention is the provision of a reliable bistable transistor circuit for driving an incandescent indicator lamp.

Another object of this invention is the provision of a transistor circuit that is inherently bistable and can be operated directly from the low voltages used with digital equipment.

A more specific object of this invention is the provision of bistable transistor circuitry that includes its own voltage sources to develop the larger signals needed yet is sensitive to the low voltage of digital equipment.

The objects stated are merely illustrative. Other objects and advantages will become more apparent from a study of the following more detailed description in conjunction with the FIGURE of the drawing showing, diagrammatically, one embodiment of this invention.

The bistable transistor circuitry of this invention includes a pair of complementary transistors, that is, a PNP transistor and a NPN transistor. The transistors have their emitters connected together and the lead connecting the emitters is grounded. The collector of the transistor T1, the PNP transistor, is connected to the base of the transistor T2, the NPN transistor, through a pair of suitable impedances, as the resistors $R_2$ and $R_3$. The base of transistor T1 is connected to the collector of transistor T2 through a suitable impedance, as resistor R5. A capacitor C may be connected in parallel to resistor R5.

The load, comprising an incandescent indicator lamp IL is connected between the collector of transistor T1 and the negative terminal NT of the voltage supply VN which has its positive terminal grounded at G. The circuitry of this invention may also be such that the load is supplied by the NPN transistor.

The base of transistor T1 is connected to the negative terminal NT through a suitable impedance, as resistor R4. This resistor R4 supplies the bias current to the base of transistor T1.

The base of transistor T2 is connected to the positive terminal PT of a voltage supply VP through a suitable impedance, as resistor R1 which supplies bias current to transistor T2.

The collector of transistor T2 is also connected to the positive terminal PT through a suitable impedance, as resistor R6. The voltage supply VP has its negative terminal grounded at G.

Briefly restated the circuitry described includes a loop circuit including the positive terminal PT, resistor R1, junction J1, resistor R2, junction J2, resistor R3, junction J3, indicating lamp IL, negative terminal NT, resistor R4, junction J4, resistor R5, junction J5, and resistor R6 back to the positive terminal PT.

The transistor T1 has its collector connected to junction J3 and its base connected to junction J4, and the transistor T2 has its base connected to junction J1 and its collector connected to junction J5. The emitters are connected together and grounded as shown.

This circuit has two stable states which are: (1) both transistors conducting simultaneously, and (2) both transistors not conducting simultaneously. This differs distinctly from a conventional transistor flip-flop circuit in which either one or the other transistor is conducting. This is a distinct advantage because of the low current requirement in the non-conducting condition since both transistors are non-conducting. For the circuit having the parameters below stated this amounted to only four milliamperes.

The circuitry of this invention has general utility but is of special utility in conjunction with low voltage output digital equipment. This digital equipment is very generally indicated by the switches S1 and S2 and the voltage supply VI. This voltage supply has its positive terminal grounded and has a —8 volt output which through switch S2 may be connected either to terminal 2 or disconnected from terminal 2. The grounded end of the battery VI may, by switch S1 be either connected to terminal 1 or disconnected from terminal 1. This bistable circuitry thus amplifies the signal by providing a visual indication by lamp IL of the status, or character, of the input signal applied to junction J2 between the resistors R2 and R3.

In order to trigger the bistable circuit "on" or "off" the isolation diodes D1 and D2 are connected between terminals 1 and 2, respectively, and junction J2. The input of the diode D1, when the switch S1 is on terminal 1, will turn the indicator "on," that is, the light IL will light up and it will remain in this state, namely "on," indefinitely even though switch S1 is moved to the open position as shown. To turn the indicator "off," that is, extinguish the light IL the switch S2 is moved to close on terminal 2. The circuit will remain "off" indefinitely even though the switch S2 is moved to the open position shown.

For the particular arrangement shown, and assuming the circuitry is in a state with no conduction of the transistors, the change of state is effected as follows: A transient signal of say zero volts on terminal 1 produces a transient signal of say —8 volts on terminal 2 and produces no conduction of the transistors.

When the transistors are in the conducting state there will be little voltage across resistors R2 and R3 and R5 and negligible current will flow through these resistors. Approximately 40 milliamperes flow through the lamp IL to the —28 volt terminal NT, and about 4 milliamperes flow through resistor R6 from the +28 volt terminal PT, when using a typical indicator lamp.

When the transistors T1 and T2 are both in the non-conducting state, bias current flows through resistors R1 and R4 tending to turn the transistors on, but larger currents flow in the opposite direction through resistors R2 and R3, and R5 and produce a net reverse bias on the transistors. In the off condition only about 4 milliamperes is drawn from both the positive and negative terminals PT and NT, respectively.

In one embodiment the resistors R1, R2, R3, R4, R5 and R6 had resistance values of 120K, 15K, 75K, 15K, 4.7K and 6.2K, respectively. The lamp was a #327, 28v., 40 ma. incandescent lamp and the transistors 2N525 and also 2N526 for T1 and 2N78 and 2N167 for T2, and the capacitor C was a 220 mmfd. type. The circuitry is not limited to the parameters of the components recited, but the values given are representative.

In the actual embodiments to check the switching speed of the circuitry, the output of a square wave generator was applied to the junction J2. Using 2N167 and 2N526 transistors and no capacitor, the maximum switching rate was about 30 kc. The limitation apparently is the time required to bring the 2N526 transistor out of saturation. After a capacitor was connected across the bias resistor for this transistor, the maximum speed was increased to 60 kc. A capacitor across the other bias resistor had no appreciable effect. However, when a 2N78 transistor was substituted for the 2N167 transistor, the switching rate increased to 100 kc. From the foregoing it is apparent that the user has to use some care in selecting the characteristics of the units in the circuitry, if operating speed is a consideration.

Further, this invention has the following improvements over the circuitry of the prior art generally for the same purpose.

(1) Inherently bistable. Gives continuous read-out with no auxiliary storage required.

(2) Provides adequate current capacity for high-intensity lamps as required for decimal read-outs.

(3) Low current requirement in "off" condition (4 ma.), because both transistors are non-conducting.

(4) High input impedance. Less than 1 ma. required to trigger.

(5) Easily triggered from conventional 8 volt logic level.

In conclusion, it is to be noted that while the disclosed examples constitute practical embodiments of the invention, the invention is not limited to the exact details disclosed, since still other modifications of the same may be made without departing from the spirit and scope of this invention.

I claim as my invention:

1. In a bistable read-out circuit for digital equipment, in combination, a loop circuit having a positive terminal, a first resistor, a first junction, a second resistor, a second junction, a third resistor, a third junction, an incandescent indicator lamp, a negative terminal, a fourth resistor, a fourth junction, a fifth resistor, a fifth junction, and a sixth resistor back to the positive terminal, a PNP transistor having a grounded emitter and having its collector connected to the third junction and its base connected to the fourth junction, a NPN transistor having a grounded emitter and having its collector connected to the fifth junction and its base connected to the first junction, and means for providing input signals of low alternately changing voltage magnitude to the second junction to cause both said transistors to conduct simultaneously or not to conduct simultaneously to thus cause said lamp to light up or to not light up alternately.

2. In a bistable read-out circuit for digital equipment, in combination, a loop circuit having a positive terminal, a first resistor, a first junction, a second resistor, a second junction, a third resistor, a third junction, an incandescent indicator lamp, a negative terminal, a fourth resistor, a fourth junction, a fifth resistor, a fifth junction, and a sixth resistor back to the positive terminal, a PNP transistor having a grounded emitter and having its collector connected to the third junction and its base connected to the fourth junction; a NPN transistor having a grounded emitter and having its collector connected to the fifth junction and its base connected to the first junction, a capacitor connected across the fourth and fifth junctions; and means for providing input signals of low alternately changing voltage magnitude to the second junction to cause both said transistors to conduct simultaneously or not to conduct simultaneously to thus cause said lamp to light up or to not light up alternately.

3. In a bistable read-out circuit for amplifying the signals received by the read-out circuit from low voltage digital equipment, in combination, a loop circuit having a terminal energized with positive potential of a selected numerical value, a first resistor having a resistance value of a selected value, a first junction, a second resistor having a resistance value of approximately one eighth that of the first resistor, a second junction, a third resistor having a resistance value approximately five eighths of the resistance value of the first resistor, a third junction, an incandescent lamp, a terminal energized with a negative potential of the same numerical value as the positive terminal, a fourth resistor having a resistance value substantially equal to the resistance value of the second resistor, a fourth junction, a fifth resistor having a resistance value somewhat more than one fourth the resistance value of the second resistor, a fifth junction, a sixth resistor, having a resistance value somewhat less than half the resistance value of the second resistor back to the positive terminal; a PNP transistor having a grounded emitter and having its collector connected to the third junction and its base connected to the fourth junction; a NPN transistor having a grounded emitter and having its collector connected to the fifth junction and its base connected to the first junction; and means for providing low voltage input signals of changing magnitude to said second junction to cause said transistors either to both conduct or to both not conduct to thus cause said incandescent lamp either to light up or not to light up.

4. In a bistable read-out circuit for amplifying the signals received by the read-out circuit from low-voltage digital equipment, in combination, a loop circuit having a terminal energized with positive potential of a selected numerical value, a first resistor having a resistance value of a selected value, a first junction, a second resistor having a resistance value of approximately one eighth that of the first resistor, a second junction, a third resistor having a resistance value approximately five eighths of the resistance value of the first resistor, a third junction, an incandescent lamp, a terminal energized with a negative potential of the same numerical value as the positive terminal, a fourth resistor having a resistance value substantially equal to the resistance value of the second resistor, a fourth junction, a fifth resistor having a resistance value somewhat more than one fourth the resistance value of the second resistor, a fifth junction, a sixth resistor, having a resistance value somewhat less than half the resistance value of the second resistor back to the positive terminal; a PNP transistor having a grounded emitter and having its collector connected to the third junction and its base connected to the fourth junction; a NPN transistor having a grounded emitter and having its collector connected to the fifth junction and its base connected to the first junction; a capacitor connected across the fourth and fifth junctions; and means for providing low voltage input signals of changing magnitude to said second junction to cause said transistors either to both conduct or to both not conduct to thus cause said incandescent lamp either to light up or not to light up.

5. Bistable transistor circuitry for amplifying input signals received by the circuitry, in combination, a pair of complementary, namely PNP and NPN transistors having connected grounded emitters, a first terminal energized with positive potential, an impedance connected between the base of the NPN transistor and said first terminal, an impedance connected between the first terminal and the collector of the NPN transistor, a second terminal energized with negative potential, an impedance connected between the base of the PNP transistor and the second terminal, a load unit connected between the second terminal and the collector of the PNP transistor, an impedance connected across the collector of the PNP transistor and the base of the NPN transistor, a second impedance and a capacitor connected in parallel with it connected across the base of said PNP transistor and the collector of the NPN transistor, and means for alternately applying one type signal or another type signal at a selected point on the impedance connected across the collector of the PNP transistor and the base of the NPN transistor.

References Cited in the file of this patent

UNITED STATES PATENTS

| | | |
|---|---|---|
| 2,829,257 | Root | Apr. 1, 1958 |
| 2,831,113 | Weller | Apr. 15, 1958 |
| 2,840,727 | Guggi | June 24, 1958 |
| 2,936,404 | Simone | May 10, 1960 |

FOREIGN PATENTS

| | | |
|---|---|---|
| 1,029,874 | Germany | May 14, 1958 |